US011875126B2

(12) United States Patent
Yang et al.

(10) Patent No.: US 11,875,126 B2
(45) Date of Patent: Jan. 16, 2024

(54) METHOD, APPARATUS, DEVICE, AND STORAGE MEDIUM FOR TRAINING MODEL AND GENERATING DIALOG

(71) Applicants: SHENZHEN INSTITUTES OF ADVANCED TECHNOLOGY, CHINESE ACADEMY OF SCIENCES, Guangdong (CN); TENCENT TECHNOLOGY (SHENZHEN) COMPANY LIMITED, Guangdong (CN)

(72) Inventors: Min Yang, Shenzhen (CN); Wei Bi, Shenzhen (CN); Xiao Jiang Liu, Shenzhen (CN); Lei Chen, Shenzhen (CN); Ting Ting Huang, Shenzhen (CN)

(73) Assignees: SHENZHEN INSTITUTES OF ADVANCED TECHNOLOGY, CHINESE ACADEMY OF SCIENCES, Shenzhen (CN); TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 435 days.

(21) Appl. No.: 17/367,883

(22) Filed: Jul. 6, 2021

(65) Prior Publication Data
US 2021/0342551 A1 Nov. 4, 2021

Related U.S. Application Data

(63) Continuation of application No. PCT/CN2020/092701, filed on May 27, 2020.

(30) Foreign Application Priority Data

May 31, 2019 (CN) .......................... 201910470526.9

(51) Int. Cl.
*G06F 40/35* (2020.01)
*G06N 3/045* (2023.01)
(Continued)

(52) U.S. Cl.
CPC ............. *G06F 40/35* (2020.01); *G06N 3/045* (2023.01); *G06N 3/08* (2013.01); *G06N 5/04* (2013.01)

(58) Field of Classification Search
CPC ........ G06F 40/35; G06N 3/045; G06N 3/044; G06N 3/08; G06N 5/04
See application file for complete search history.

(56) References Cited

U.S. PATENT DOCUMENTS

2009/0171956 A1* 7/2009 Gupta .................... G06F 16/35
707/999.102
2017/0213545 A1* 7/2017 Kwon .................... G06N 5/022
(Continued)

FOREIGN PATENT DOCUMENTS

CA 2689026 A1 * 1/2011 ......... G06K 9/00993
CA 2968016 C * 1/2023 ......... G06F 16/3325
(Continued)

OTHER PUBLICATIONS

Nie, Yuan-ping, et al. "Attention-based encoder-decoder model for answer selection in question answering." Frontiers of Information Technology & Electronic Engineering 18.4: 535-544. (Year: 2017).*
(Continued)

*Primary Examiner* — Daniel C Washburn
*Assistant Examiner* — Oluwadamilola M Ogunbiyi
(74) *Attorney, Agent, or Firm* — Sughrue Mion, PLLC

(57) ABSTRACT

A method for training a dialog generation model includes: acquiring a dialog data set, and encoding a post in the dialog data set by using an encoder in the dialog generation model to obtain an encoded representation of the post; fusing, by
(Continued)

using a decoder in the dialog generation model, the encoded representation of the post and knowledge information corresponding to the post that is obtained from a knowledge base question answering model through transfer learning to obtain a predicted response corresponding to the post; determining a value of a loss function of the dialog generation model based on the predicted response and the annotated response that correspond to the post; and updating a model parameter of the dialog generation model based on the value of the loss function. A method, an apparatus, a device, and a computer storage medium for generating a dialog are also provided.

20 Claims, 10 Drawing Sheets

(51) Int. Cl.
*G06N 3/08* (2023.01)
*G06N 5/04* (2023.01)

(56) References Cited

U.S. PATENT DOCUMENTS

| | | | |
|---|---|---|---|
| 2017/0323204 A1 | 11/2017 | Akbulut et al. | |
| 2018/0137854 A1* | 5/2018 | Perez | G06F 40/35 |
| 2019/0130248 A1 | 5/2019 | Zhong et al. | |
| 2020/0142989 A1* | 5/2020 | Bordawekar | G06N 5/04 |
| 2020/0184155 A1* | 6/2020 | Galitsky | G06F 40/279 |
| 2020/0202241 A1* | 6/2020 | Abeliuk | G16B 40/00 |
| 2020/0279105 A1* | 9/2020 | Muffat | G06N 3/08 |
| 2020/0342879 A1* | 10/2020 | Carbune | H04L 63/00 |
| 2020/0364551 A1* | 11/2020 | Dwivedi | G06N 3/08 |
| 2020/0372423 A1* | 11/2020 | Sabharwal | G06F 16/345 |
| 2021/0313077 A1* | 10/2021 | Smurro | G16H 50/20 |

FOREIGN PATENT DOCUMENTS

| | | | | |
|---|---|---|---|---|
| CN | 108021705 A | | 5/2018 | |
| CN | 109213851 A | | 1/2019 | |
| CN | 109508457 A | * | 3/2019 | ............ G06F 40/30 |
| CN | 109597993 A | | 4/2019 | |
| CN | 110032646 A | * | 7/2019 | ............ G06F 16/35 |
| CN | 110188182 A | | 8/2019 | |
| CN | 111046147 A | * | 4/2020 | ............... G06F 6/35 |
| KR | 102132407 B1 | * | 7/2020 | ............... G06N 3/08 |
| WO | WO-2020159395 A1 | * | 8/2020 | ............ G06F 16/90 |

OTHER PUBLICATIONS

Fan, Xing, et al. "Transfer learning for neural semantic parsing." arXiv preprint arXiv:1706.04326. (Year: 2017).*
Min, Sewon, Minjoon Seo, and Hannaneh Hajishirzi. "Question answering through transfer learning from large fine-grained supervision data." arXiv preprint arXiv:1702.02171 (2017). (Year: 2017).*
McCann, Bryan, et al. "The natural language decathlon: Multitask learning as question answering." arXiv preprint arXiv:1806.08730. (Year: 2018).*
Dehghani, Mostafa, et al. "Learning to transform, combine, and reason in open-domain question answering." Proceedings of the Twelfth ACM International Conference on Web Search and Data Mining. (Year: 2019).*
Written opinion for PCT/CN2020/092701 dated Aug. 27, 2020.
International search report for PCT/CN2020/092701 dated Aug. 27, 2020.
Translation of Written Opinion dated Aug. 27, 2020 from the International Searching Authority in International Application No. PCT/CN2020/092701.

* cited by examiner

METHOD, APPARATUS, DEVICE, AND STORAGE MEDIUM FOR TRAINING MODEL AND GENERATING DIALOG

CROSS-REFERENCE TO RELATED APPLICATION(S)

This application is a bypass continuation application of International Application No. PCT/CN2020/092701, filed on May 27, 2020, which claims priority to Chinese Patent Application No. 201910470526.9, filed with the China National Intellectual Property Administration on May 31, 2019, the disclosures of which are incorporated by reference in their entireties.

FIELD

The disclosure relates to the technical field of machine learning, and in particular, to a method, an apparatus, a device, and a computer storage medium for training a dialog generation model and generating a dialog.

BACKGROUND

An open-domain dialog generation task means that a machine generates a corresponding response according to a post of a dialog in an open domain, which is increasingly popular and researched due to its powerful functions and wide range of application scenarios.

The open-domain dialog generation task is generally achieved depending on a dialog generation model. In order to enable the dialog generation model to generate more informative and reasonable responses, other information may be fused into the open-domain dialog generation task, so that more reasonable and informative responses can be generated.

However, a fusion effect is undesirable because accuracy and rationality of the added information are not considered. As a result, actual application requirements cannot be satisfied.

SUMMARY

The disclosure provides a method for training a dialog generation model, which trains the dialog generation model by performing transfer learning on knowledge information in a learning knowledge base question answering model. By virtue of a high precision of the knowledge base question answering model, the knowledge information is more desirably fused, thereby improving accuracy of dialog generation. The disclosure further provides a method for generating a dialog and a corresponding apparatus, device, computer storage medium, and computer program product.

In view of this, an embodiment of the disclosure provides a method for training a dialog generation model. The method includes:

acquiring a dialog data set, each piece of dialog data in the dialog data set that is used as a training sample comprising a post and an annotated response corresponding to the post;

encoding the post in the dialog data set by using an encoder in a dialog generation model to obtain a first encoded representation of the post;

fusing, by using a decoder in the dialog generation model, the first encoded representation of the post and knowledge information corresponding to the post, to obtain a predicted response corresponding to the post, the knowledge information being obtained from a knowledge base question answering model through transfer learning;

determining a value of a loss function of the dialog generation model based on the predicted response and the annotated response that corresponds to the post; and updating a model parameter of the dialog generation model based on the value of the loss function.

An embodiment of the disclosure provides a method for training a dialog generation model, including:

receiving a post from a terminal;

obtaining a first encoded representation of the post by using an encoder in a dialog generation model, the dialog generation model being pre-trained by using knowledge information obtained from a knowledge base question answering model through transfer learning;

fusing, by using a decoder in the dialog generation model, the first encoded representation of the post and knowledge information corresponding to the post, to obtain a predicted response corresponding to the post that is outputted by the dialog generation model, the knowledge information corresponding to the post being obtained from the knowledge base question answering model through the transfer learning; and transmitting the predicted response to the terminal.

An embodiment of the disclosure further provides a method for training a dialog generation model, performed a server, the server including one or more processors, a memory, and one or more programs, the one or more programs being stored in the memory, the program including one or more units, each unit corresponding to a set of instructions, the one or more processors being configured to execute the instructions; the method including:

acquiring a dialog data set, each piece of dialog data in the dialog data set that is used as a training sample comprising a post and an annotated response corresponding to the post;

encoding the post in the dialog data set by using an encoder in a dialog generation model to obtain a first encoded representation of the post;

fusing, by using a decoder in the dialog generation model, the first encoded representation of the post and knowledge information corresponding to the post, to obtain a predicted response corresponding to the post, the knowledge information being obtained from a knowledge base question answering model through transfer learning;

determining a value of a loss function of the dialog generation model based on the predicted response and the annotated response that corresponds to the post; and updating a model parameter of the dialog generation model based on the value of the loss function.

An embodiment of the disclosure further provides a method for generating a dialog, performed a server, the server including one or more processors, a memory, and one or more programs, the one or more programs being stored in the memory, the program including one or more units, each unit corresponding to a set of instructions, the one or more processors being configured to execute the instructions; the method including:

receiving a post from a terminal;

obtaining a first encoded representation of the post by using an encoder in a dialog generation model, the dialog generation model being pre-trained by using knowledge information obtained from a knowledge base question answering model through transfer learning;

fusing, by using a decoder in the dialog generation model, the first encoded representation of the post and knowledge information corresponding to the post, to obtain a predicted response corresponding to the post that is outputted by the dialog generation model, the knowledge information corresponding to the post being obtained from the knowledge base question answering model through the transfer learning; and transmitting the predicted response to the terminal.

An embodiment of the disclosure provides an apparatus for training a dialog generation model. The apparatus includes:

at least one memory configured to store program code; and at least one processor configured to read the program code and operate as instructed by the program code, the program code comprising:

acquisition code configured to cause the at least one processor to acquire a dialog data set, each piece of dialog data in the dialog data set that is used as a training sample comprising a post and an annotated response corresponding to the post; and training code configured to cause the at least one processor to:

encode the post in the dialog data set by using an encoder in a dialog generation model to obtain an encoded representation of the post;

fuse, by using a decoder in the dialog generation model, the encoded representation of the post and knowledge information corresponding to the post, to obtain a predicted response corresponding to the post, the knowledge information being obtained from a knowledge base question answering model through transfer learning;

determine a value of a loss function of the dialog generation model based on the predicted response and the annotated response that correspond to the post; and update a model parameter of the dialog generation model based on the value of the loss function.

An embodiment of the disclosure provides an apparatus for generating a dialog. The apparatus includes:

at least one memory configured to store program code; and at least one processor configured to read the program code and operate as instructed by the program code, the program code comprising:

receiving code configured to cause the at least one processor to receive a post from a terminal;

obtaining code configured to cause the at least one processor to obtain a first encoded representation of the post by using an encoder in a dialog generation model, the dialog generation model being pre-trained by using knowledge information obtained from a knowledge base question answering model through transfer learning;

fusing code configured to cause the at least one processor to fuse, by using a decoder in the dialog generation model, the first encoded representation of the post and knowledge information corresponding to the post, to obtain a predicted response corresponding to the post that is outputted by the dialog generation model, the knowledge information corresponding to the post being obtained from the knowledge base question answering model through the transfer learning; and transmitting code configured to cause the at least one processor to transmit the predicted response to the terminal.

An embodiment of the disclosure further provides a device, including a processor and a memory:

the memory being configured to store a computer program; and the processor being configured to perform the method for training a dialog generation model according to the embodiments of the disclosure or the method for generating a dialog according to the embodiments of the disclosure when executing the computer program.

An embodiment of the disclosure provides a computer-readable storage medium storing a program code, the program code being used for performing the method for training a dialog generation model according to the embodiments of the disclosure or the method for generating a dialog according to the embodiments of the disclosure.

An embodiment of the disclosure provides a computer program product including instructions, the instructions, when executed on a computer, causing the computer to perform the method for training a dialog generation model according to the embodiments of the disclosure or the method for generating a dialog according to the embodiments of the disclosure.

BRIEF DESCRIPTION OF THE DRAWINGS

To describe the technical solutions in example embodiments of the disclosure or the related art more clearly, the following briefly describes the accompanying drawings for describing the example embodiments. The accompanying drawings in the following description show only some embodiments of the disclosure, and a person of ordinary skill in the art may derive other drawings from the accompanying drawings without creative efforts.

DETAILED DESCRIPTION

Figure 1:
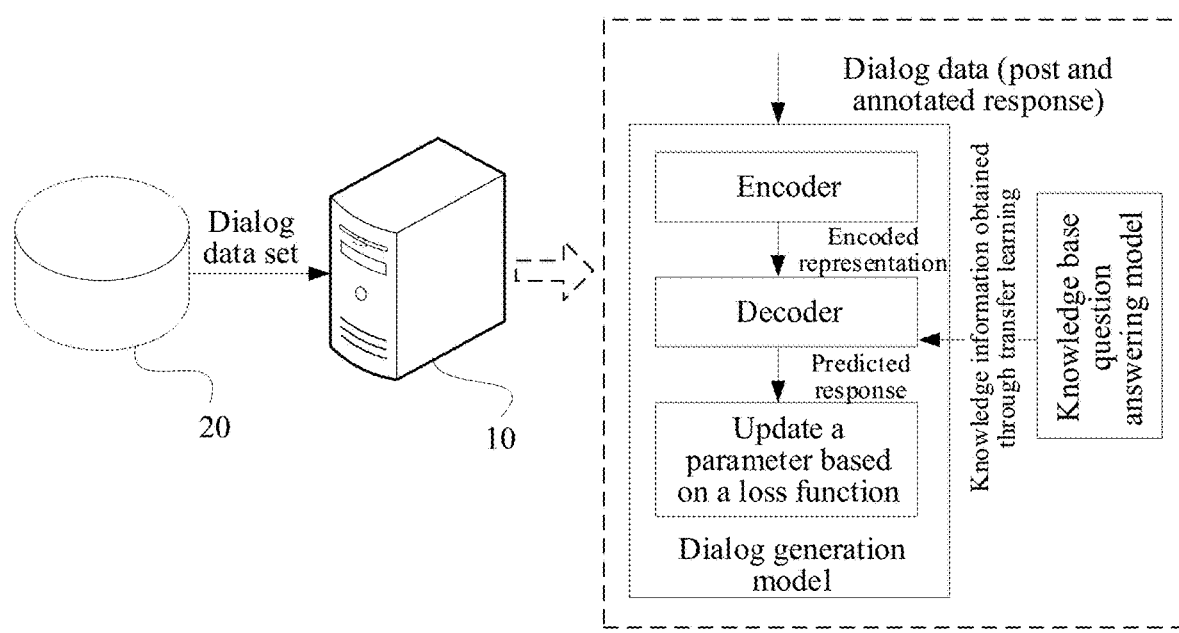
FIG. 1 is an architecture diagram of a scenario of a method for training a dialog generation model according to an embodiment of the disclosure.

In order to make a person skilled in the art better understand the solutions of the disclosure, the following clearly and completely describes the technical solutions in some example embodiments of the disclosure with reference to the accompanying drawings. The described embodiments are only some of the embodiments of the disclosure rather than all of the embodiments. All other embodiments obtained by a person of ordinary skill in the art based on the embodiments of the disclosure without creative efforts shall fall within the protection scope of the disclosure.

In the specification, claims, and accompanying drawings of the disclosure, the terms "first", "second", "third", "fourth", and so on (if existing) are intended to distinguish between similar objects rather than describe a specific order or sequence. It is to be understood that the data termed in such a way are interchangeable in proper circumstances, so that the embodiments of the disclosure described herein may be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

In the related art, there is a problem that a fusion effect obtained by associating an entity in a post with external knowledge to fuse the external knowledge into a response is poor that actual application requirements cannot be satisfied. The disclosure provides a method for training a dialog generation model that solves the above problem. In the method, during training of the dialog generation model, knowledge information for a post is transferred from a knowledge base question answering (KBQA) model. Since the knowledge base question answering model has a relatively high precision, a fusion effect of fusing an encoded representation of the post and the knowledge information for the post is desirable. The dialog generation model may output a predicted response for the post based on the fused information. A loss function may be determined based on the predicted response and an annotated response carried in dialog data in the dialog data set. A parameter of the dialog generation model is adjusted based on the loss function to achieve model training, which improves training efficiency and accuracy, and enables the model to satisfy actual application requirements.

It would be understood that the method for training a dialog generation model provided in the disclosure is applicable to any processing device having a data processing capability. The processing device may be a terminal or a server. The terminal may be a desktop terminal, a portable mobile terminal such as a smart phone, a tablet computer, or the like, an on-board terminal, an augmented reality (AR) terminal, or a virtual reality (VR) terminal, which is not limited in the disclosure.

The processing device may exist independently or in a form of a cluster. In an embodiment, the above method for training a dialog generation model may be stored in the processing device in a form of a computer program, and the processing device implements the method for training a dialog generation model of the disclosure by executing an application program. The computer program may be an independent application program, or may be a functional module, a plug-in, an applet, or the like integrated on other programs.

In order to make the technical solutions of the disclosure clearer and easier to understand, the method for training a dialog generation model provided in the disclosure is described below with reference to example scenarios in which a server is used as an example of the processing device.

FIG. 1 is an architecture diagram of a scenario of a method for training a dialog generation model according to an embodiment of the disclosure. Referring to FIG. 1, the scenario includes a server 10 and a sample library 20. A dialog data set is stored in the sample library 20, and the server 10 acquires a dialog data set from the sample library 20 to perform model training.

In some embodiments of the disclosure, dialog data in the dialog data set includes a post and an annotated response corresponding to the post. The server 10 obtains an encoded representation of the post by using an encoder in a constructed dialog generation model based on the post in the dialog data set, and fuses, by using a decoder in the dialog generation model, the encoded representation of the post and knowledge information that is obtained for the post from a knowledge base question answering model through transfer learning, to obtain a predicted response corresponding to the post that is outputted by the dialog generation model. Then, a loss function is determined based on the predicted response and the annotated response that correspond to the post, and a parameter of the dialog generation model is adjusted by using the loss function until the loss function of the dialog generation model converges.

Next, operations of the method for training a dialog generation model provided in the embodiments of the disclosure are described in detail from a perspective of the server.

Figure 2:
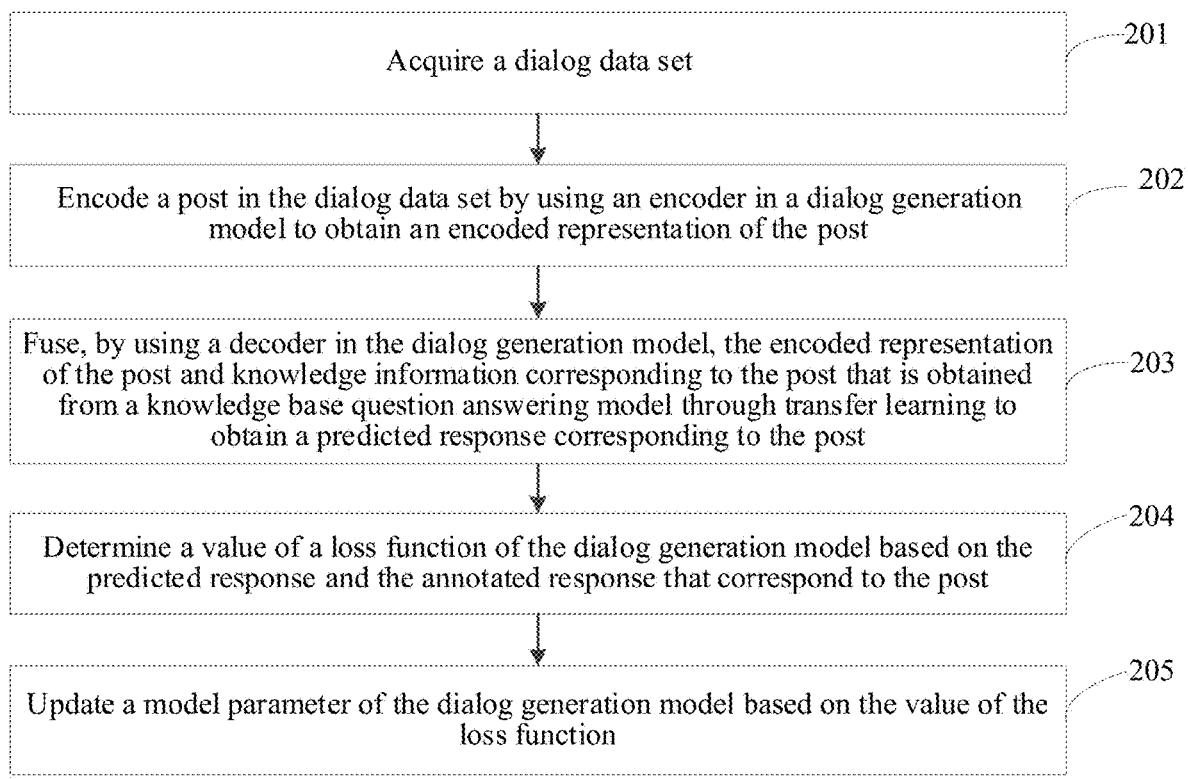
FIG. 2 is a flowchart of the method for training a dialog generation model according to an embodiment of the disclosure.

FIG. 2 is a flowchart of the method for training a dialog generation model according to an embodiment of the disclosure. Referring to FIG. 2, the method includes the following operations 201-205:

201: Acquire a dialog data set.

Dialog data in the dialog data set includes a post and an annotated response corresponding to the post. Each set of dialog data in the dialog data set is used as a training sample for training the dialog generation model. In an embodiment, the dialog data set may be an existing data set, such as a reddit single-round dialog data set, or may be generated by the server by crawling a post from a network and annotating a response corresponding to the post.

202: Encode a post in the dialog data set by using an encoder in the dialog generation model to obtain an encoded representation of the post.

The encoded representation of the post is obtained by using the encoder in the constructed dialog generation model based on the post in the dialog data set, and the encoded representation of the post and knowledge information that is obtained for the post from a knowledge base question answering model through transfer learning is fused by using a decoder in the dialog generation model, to obtain a predicted response corresponding to the post that is outputted by the dialog generation model.

It would be understood that the dialog generation model is a network model based on an encoder-decoder structure. The dialog generation model uses a post as an input and a response to the post as an output. The server encodes the post inputted to the model by using the encoder to obtain the encoded representation of the post, and the decoder fuses the encoded representation of the post and the knowledge information that is obtained for the post from the knowledge base question answering model through transfer learning, and decodes the fused information to generate the predicted response corresponding to the post.

In an embodiment of the disclosure, the server may determine a word embedding representation of the post based on a word embedding model by using the constructed dialog generation model, and then obtain a hidden layer state representation according to the word embedding representation through encoding by using a bidirectional long short-term memory (BiLSTM) network, and use the hidden layer state representation as the encoded representation of the post.

Since the dialog generation model has a sequence-to-sequence (Seq2Seq) framework, the post inputted to the dialog generation model may be presented in a form of a sequence of words, such as a post X={$x_1$, $x_2$, ... $x_{Tx}$}. An answer outputted by the dialog generation model may also be presented in a form of word sequences, such as an answer Y={$y_1$, $y_2$, ... $y_{Ty}$}. In this case, training the dialog generation model means modeling for a conditional probability P(Y|X).

In an embodiment of the disclosure, the server implements the modeling for P(Y|X) by using the knowledge base question answering model. The knowledge base question answering model is a question answering model based on a knowledge base. The knowledge base, also referred to as a knowledge graph, is a large database having knowledge as a main unit and entities as a main carrier and including cognition for thousands of things and various facts. Knowledge in the knowledge base is generally presented in a triple form, which is specifically expressed as <head entity, relationship, tail entity>. The entities may be a person, a place, a specific concept, or the like, and the relationship may be logical relationship between the head entity and the tail entity. For example, the capital Beijing of China may be represented by the following triple: <China, Capital, Beijing>.

In an embodiment, the server performs transfer learning on the knowledge information for the post from the knowledge base question answering model. In some embodiments of the disclosure, the server obtains a context attention vector of the post, and inputs the context attention vector of the post to a multi-layer perceptron (multi-layer perception) (MLP) network in the knowledge base question answering model, and obtains an enhanced attention vector of the post by using the MLP network, and uses the enhanced attention vector of the post as the knowledge information that is obtained for the post from the knowledge base question answering model through transfer learning.

In this way, the server fuses the encoded representation of the post and the enhanced attention vector by using the decoder in the dialog generation model, and may perform a word probability distribution prediction on a fused vector by using a classifier in the dialog generation model such as softmax, to obtain the predicted response corresponding to the post that is outputted by the dialog generation model.

203: Fuse, by using a decoder in the dialog generation model, the encoded representation of the post and knowledge information corresponding to the post, that is obtained from a knowledge base question answering model through transfer learning, to obtain a predicted response corresponding to the post.

204: Determine a value of a loss function of the dialog generation model based on the predicted response and the annotated response that correspond to the post.

205: Update a model parameter of the dialog generation model based on the value of the loss function.

In an embodiment, the loss function is used for representing an inconsistency between the predicted response and the annotated response. It would be understood that the loss function includes a plurality of types loss functions, and a loss function of a corresponding type may be selected depending on an embodiment. For example, the server may adopt a cross-entropy loss function for model training. In other words, the server may use a cross-entropy between a word distribution of the predicted response and a word distribution of the annotated response as the loss function of the dialog generation model, which may be expressed as follows:

$$L(D, \theta) = - \sum_{(x,y) \in D} \sum_{t=1}^{T_y} \log P(y_t \mid y < t, x; \theta) \quad (1)$$

L being the loss function, θ representing a set of all parameters of the model, D representing a training set including a sequence pair of <post, response>, $T_y$ representing a length of the generated response, and x, y, and t respectively representing the post, the response, and a decoding time step.

In an embodiment of the disclosure, the server determines the loss function according to the predicted response and the annotated response that corresponds to the post, and then adjusts the parameters of the dialog generation model based on the loss function until the loss function of the dialog generation model converges. In this way, the training of dialog generation model is achieved.

It can be learned from the above that an embodiment of the disclosure provides the method for training a dialog generation model. In the method, during training of the dialog generation model, the knowledge information for the post is transferred from the knowledge base question answering model. Since the knowledge base question answering model has a relatively high precision, a fusion effect of fusing an encoded representation of the post and the knowledge information for the post is desirable. The dialog generation model may output a predicted response for the post based on the fused information. A loss function may be determined based on the predicted response and an annotated response carried in dialog data in the dialog data set. A parameter of the dialog generation model is adjusted based on the loss function to achieve model training, which improves training efficiency and accuracy, and enables the model to satisfy actual application requirements.

It would be understood that, in addition to transferring the knowledge information from the knowledge base question answering model through transfer learning, the server may further transfer a sentence modeling representation for the post from the knowledge base question answering model through transfer learning, and combines the sentence modeling representation with the encoded representation obtained by the encoder by encoding the post. In this way, a precision of the encoded representation may be improved, thereby improving the accuracy and the rationality of the response generation for the dialog generation model.

In some embodiments of the disclosure, the server obtains, by using the encoder in the dialog generation model, the encoded representation of the post as a first encoded representation of the post, and the server further inputs the post to the knowledge base question answering model to obtain the encoded representation outputted by the encoder in the knowledge base question answering model as a second encoded representation of the post, and then splices the first encoded representation of the post and the second encoded representation of the post, and uses the spliced encoded representation as a comprehensive encoded representation of the post. During decoding, the server fuses, by using the decoder in the dialog generation model, the comprehensive encoded representation of the post and the knowledge information that is obtained for the post from the knowledge base question answering model through transfer learning for decoding.

In some possible implementations, the server may also introduce a response guiding attention mechanism to generate the encoded representation of the post. The response guiding attention mechanism means retrieving a similar post corresponding to the post, using a response corresponding to the similar post as a similar candidate response to the post, and determining, according to a word embedding representation of the similar candidate response and the first encoded representation, a mutual attention as a third encoded representation of the post. In this way, the server may splice the first encoded representation of the post and the third encoded representation of the post, use a spliced encoded representation as the comprehensive encoded representation of the post, and fuses, by using the decoder in the dialog generation model, the comprehensive encoded representation of the post and the knowledge information for the post that is learned from the knowledge base question answering model through transfer learning for decoding.

In an embodiment, the server may also splice the first encoded representation of the post, the second encoded representation of the post, and the third encoded representation of the post, and uses a spliced encoded representation as the comprehensive encoded representation of the post, and then fuse, by using the decoder in the dialog generation model, the comprehensive encoded representation of the post and the knowledge information for the post that is learned from the knowledge base question answering model through transfer learning.

It would be understood that the knowledge base question answering model in the embodiment shown in FIG. 2 may be pre-constructed. The disclosure further provides an implementation of constructing the knowledge base question answering model. In some embodiments of the disclosure, the server constructs a neural network model having an end-to-end structure, and then trains the neural network model based on a general data set and a common sense knowledge base. The general data set may be simple questions, and the common sense knowledge base may be a freebase-FB2M. During the training, a parameter of the neural network model is adjusted by using a hinge loss function until a loss function of the neural network model converges, and the neural network model that converges is used as the knowledge base question answering model.

In an example, the hinge loss function in an embodiment of the disclosure is:

$$\text{loss}=\max\{0, \lambda - S(q, G^+) + S(q, G^-)\} \qquad (2)$$

q representing the post, G representing a candidate knowledge answer set, $G^+$ representing a set of positive instances, $G^-$ representing a set of negative instances, S representing a correlation between q and the set of positive instances or the set of negative instances in G, and $\lambda$ being a hyperparameter.

The above is an illustrative implementation of the method for training a dialog generation model according to the embodiments of the disclosure and the dialog generation model obtained through training based on the above implementation. The disclosure further provides a method for generating a dialog, which is described below with reference to example embodiments.

It would be understood that the method for generating a dialog provided in the disclosure is applicable to a server. The method for generating a dialog is stored in the server in a form of a computer program, and the server implements the method for generating a dialog of the disclosure by executing the computer program.

In order to facilitate understanding, the method for generating a dialog is further described in combination with example scenarios.

Figure 3:
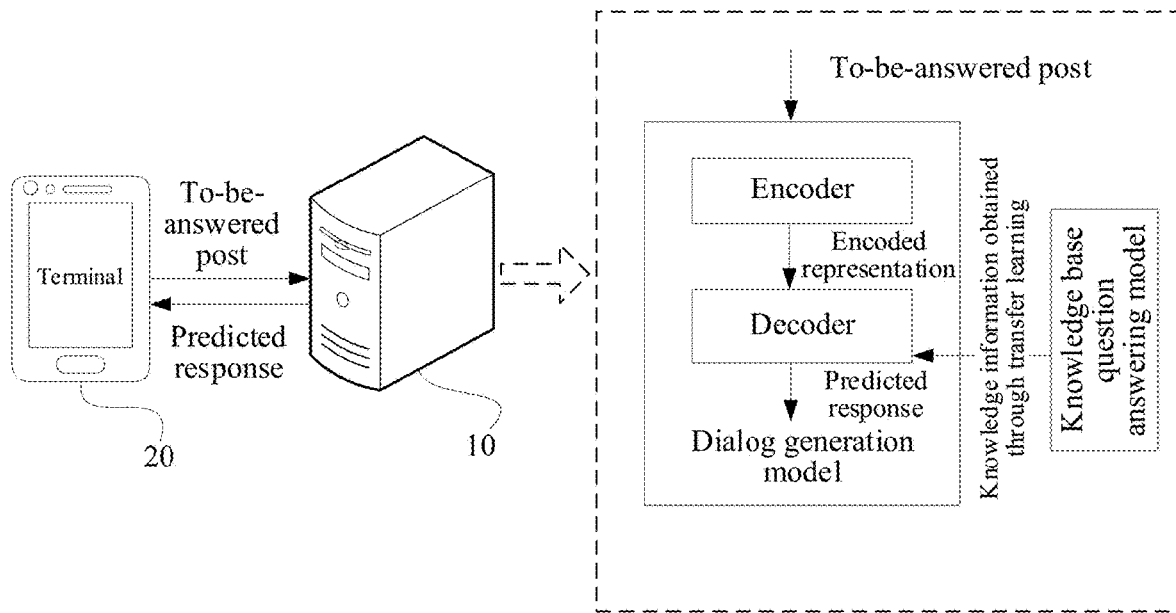
FIG. 3 is an architectural diagram of a scenario of a method for generating a dialog according to an embodiment of the disclosure.

FIG. 3 is an architectural diagram of a scenario of a method for generating a dialog according to an embodiment of the disclosure. Referring to FIG. 3, the scenario includes a server 10 and a terminal 20. The server 10 receives a to-be-answered post (that is, a post that needs to be answered) transmitted by the terminal, obtains an encoded representation of the post by using an encoder in a pre-trained dialog generation model, and fuse, by using a decoder in the dialog generation model, the encoded representation of the post and knowledge information that is obtained for the post from a knowledge base question answering model through transfer learning to obtain a predicted response corresponding to the post that is outputted by the dialog generation model. Then, the server 10 transmits the predicted response to the terminal 20, and instructs the terminal 20 to display the predicted response, to achieve intelligent interaction with a user.

Next, operations of the method for generating a dialog according to an embodiment of the disclosure are described in detail from the perspective of a server.

Figure 4:
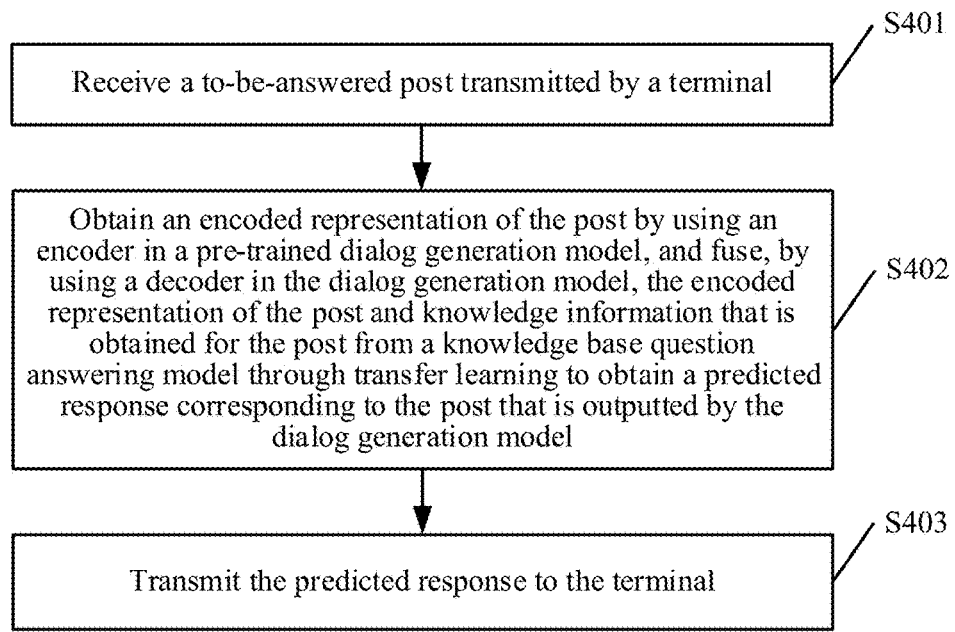
FIG. 4 is a flowchart of a method for generating a dialog according to an embodiment of the disclosure.

FIG. 4 is a flowchart of a method for generating a dialog according to an embodiment of the disclosure. Referring to FIG. 4, the method includes the following operations S401-S403:

S401: Receive a to-be-answered post transmitted by a terminal.

In an embodiment of the disclosure, a display interface of the terminal carries an input control and/or a selection control. A user may input a post to be answered by using the input control, or select a post by using the selection control. The terminal transmits a post to a server in response to the input operation or the selection operation of the user.

When inputting a post or selecting a post, the user may input or select one post, or may input or select a plurality of posts. A number of posts does not affect the implementation manner of the disclosure.

S402: Obtain an encoded representation of the post by using an encoder in a pre-trained dialog generation model, and fuse, by using a decoder in the dialog generation model, the encoded representation of the post and knowledge information that is obtained for the post from a knowledge base question answering model through transfer learning to obtain a predicted response corresponding to the post that is outputted by the dialog generation model.

S403: Transmit the predicted response to the terminal.

The pre-trained dialog generation model is trained by using the knowledge information obtained from the knowledge base question answering model through transfer learning, to generate a response statement matching the post by using the dialog generation model.

In some embodiments of the disclosure, the server has a dialog generation model therein. The server encodes the post by using an encoder in a dialog generation model to obtain the encoded representation of the post, and fuses, by using a decoder in the dialog generation model, the encoded representation of the post and the knowledge information that is obtained for the post from the knowledge base question answering model through transfer learning, and then classifies decoded information by using a classifier in the dialog generation model to obtain the predicted response corresponding to the post that is outputted by the dialog generation model.

For the encoding process, the disclosure provides a plurality of implementations for obtaining the encoded representation of the post, non-limiting examples of which are respectively described below.

In a first example implementation, a first encoded representation is generated through encoding by using the encoder in the dialog generation model, and the first encoded representation is used as the encoded representation of the post. In an embodiment of the disclosure, the server may determine a word embedding representation of the post based on a word embedding model by using the constructed dialog generation model, and then encode the word embedding representation by using a BiLSTM network to obtain a hidden layer state representation, and use the hidden layer state representation as the first encoded representation of the post. In this way, the encoded representation of the post is obtained.

In a second example implementation, the server inputs the post to the knowledge base question answering model to obtain the encoded representation outputted by the encoder in the knowledge base question answering model as a second encoded representation of the post. The second encoded representation is a sentence modeling representation that is obtained for the post from the KBQA through transfer learning. The first encoded representation of the post and the second encoded representation of the post are spliced, and a spliced encoded representation is used as a comprehensive encoded representation of the post.

In a third example implementation, the server determines a response corresponding to a similar post to the post as a similar candidate response, and determines, according to a word embedding representation of the similar candidate response and the first encoded representation of the post, a mutual attention as a third encoded representation of the post, and then splices the first encoded representation of the post and the third encoded representation of the post, and uses a spliced encoded representation as the comprehensive encoded representation of the post.

In a fourth example implementation, the first encoded representation, the second encoded representation, and the third encoded representation of the post are spliced, and then a spliced encoded representation is used as the comprehensive encoded representation of the post.

For a decoding process, the server introduces the knowledge information that is obtained for the post from the knowledge base question answering model through transfer learning for fusion, which has a desirable fusion effect. In some embodiments of the disclosure, the server obtains a context attention vector of the post, inputs the context attention vector of the post to an MLP network in the knowledge base question answering model, obtains an enhanced attention vector of the post by using the MLP network, and uses the enhanced attention vector of the post as the knowledge information that is obtained for the post from the knowledge base question answering model through transfer learning. In this way, the server fuses, by using a decoder in the dialog generation model, the encoded representation of the post and knowledge information that is obtained for the post from a knowledge base question answering model through transfer learning, to obtain a predicted response corresponding to the post that is outputted by the dialog generation model.

Obtaining the enhanced attention vector of the post based on the MLP network may be implemented in the following manner in an embodiment of the disclosure: acquiring knowledge information obtained by the MLP network through transfer based on the context attention vector of the post and words in a knowledge base vocabulary; and determining the enhanced attention vector of the post according to the context attention vector of the post and an entity embedding representation of each word in the knowledge base vocabulary.

In an embodiment, the server obtains a hidden layer state representation of the decoder in the dialog generation model, and inputs the hidden layer state representation of the decoder in the dialog generation model and the above enhanced attention vector to a classification layer of the dialog generation model, such as a softmax layer, and generates the predicted response corresponding to the post according to a predicted word distribution outputted by the classification layer.

Obtaining the hidden layer state representation of the decoder in the dialog generation model may be implemented in the following manner in an embodiment of the disclosure: using a hidden state representation of the encoder in the dialog generation model for a last word in the post as an initial state of the decoder in the dialog generation model, and using a preset symbol as an initial symbol (start of sentence, SOS); and using a state of the decoder in the dialog generation model at a previous time step, a word embedding representation corresponding to a symbol generated at the previous time step, and an attention vector generated at a current time step of the encoder in the dialog generation model as an input of the decoder in the dialog generation model to obtain a hidden layer state representation of the decoder in the dialog generation model at the current time step.

During decoding of the first time step, due to lack of a state of the previous time step, the initial state may be used as the state of the previous time step, and due to lack of a generated word of the previous time step, the SOS may be used as the generated word of the previous time step.

The encoded representation of the post that is fused by the decoder is an encoded representation obtained in the above encoding process. In other words, during encoding by using the first implementation, the decoder fuses the first encoded representation. During encoding by using the second, third, or fourth example implementation, the decoder fuses the comprehensive encoded representation obtained through splicing.

It can be learned from the above that an example embodiment of the disclosure provides the method for generating a dialog, which is implemented based on the dialog generation model. The dialog generation model transfers the knowledge information in the knowledge base question answering model to an open-domain dialog generation task. By virtue of a high precision of the knowledge base question answering model, the model may more desirably fuse the knowledge information, thereby improving accuracy and rationality of dialog generation.

In order to make the technical solutions of the disclosure clearer and easier to understand, the disclosure further provides an example embodiment of the method for generating a dialog, which is described below in combination with a structure of the dialog generation model.

Figure 5:
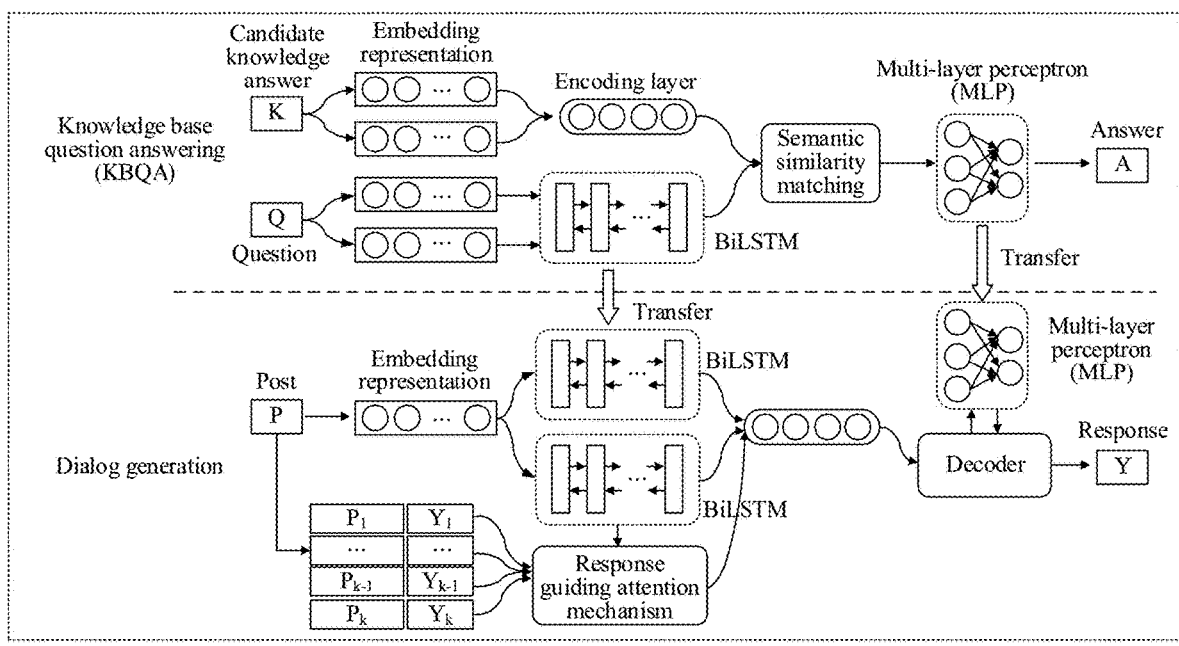
FIG. 5 is a schematic structural diagram of a dialog generation model according to an embodiment of the disclosure.
Figure 6:
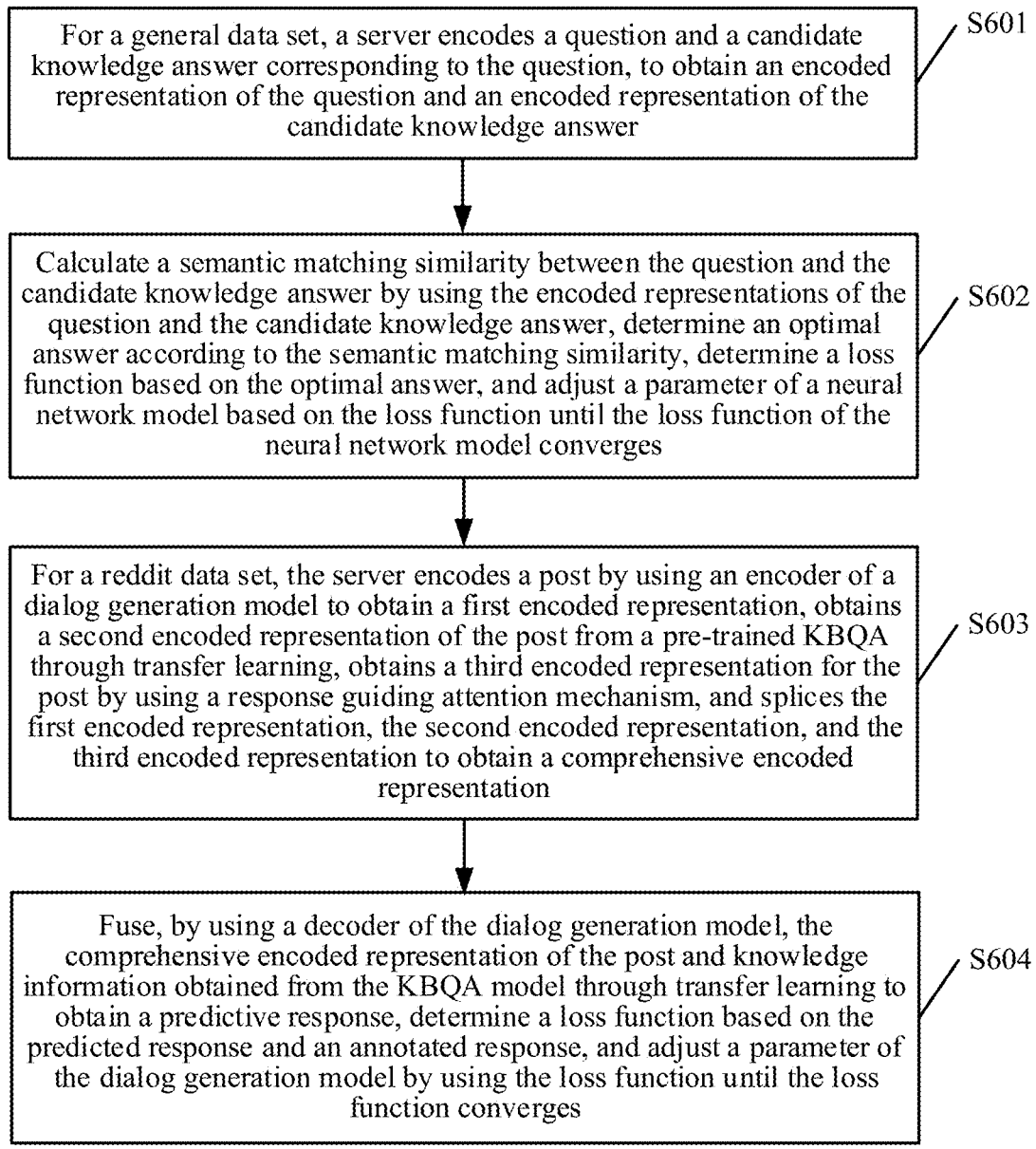
FIG. 6 is a flowchart of a method for generating a dialog according to an embodiment of the disclosure.

FIG. 5 is a schematic structural diagram of a dialog generation model according to an embodiment of the disclosure, and FIG. 6 is a flowchart of a method for generating a dialog according to an embodiment of the disclosure. As shown in FIG. 5, the dialog generation model mainly includes: a knowledge base question answering (KBQA) module and a dialog generation model.

In the KBQA module, a server first determines embedding representations of a question Q and a candidate knowledge answer K. For the question Q, the embedding representation thereof is encoded by using a BiLSTM network, and is then spliced to obtain an encoded representation of the question Q. For the candidate knowledge answer K, an encoded representation of the candidate knowledge answer is obtained through encoding by an encoding layer of the module. A semantic similarity is calculated based on the encoded representations of the question Q and the candidate knowledge answer K. The MLP network may select, based on a semantic similarity matching result, an optimal candidate answer as an answer A to the question Q.

In the dialog generation model, an embedding representation of a post P is determined, and the embedding representation of the post is encoded by using the BiLSTM network, and is then spliced to obtain a first encoded representation of the post. In addition, a modeling representation of the post, that is, a second encoded representation of the post is obtained from the KBQA through transfer learning, a context attention vector is determined based on the post P, and a third encoded representation of the post is determined based on the context attention vector and a response guiding attention mechanism. The first encoded representation, the second encoded representation, and the third encoded representation are spliced to obtain a comprehensive encoded representation. The decoder in the dialog generation model fuses the comprehensive encoded representation and the knowledge information that is obtained for the post from the MLP network in the KBQA by the dialog generation model through transfer learning, to generate a response Y.

The training process of the dialog generation model includes two parts: first, the KBQA is pre-trained, as shown in S601 and S602 in FIG. 6, and then the dialog generation model is trained based on the pre-trained KBQA, as shown in S603 and S604 in FIG. 6. The method includes the following operations:

S601: For a general data set, the server encodes a question and a candidate knowledge answer corresponding to the question, to obtain an encoded representation of the question and an encoded representation of the candidate knowledge answer.

In some embodiments of the disclosure, the general data set, such as simple questions, includes a plurality of sets of question answering data. Each set of the question answering data includes a question Q and a candidate knowledge answer set G corresponding to the question Q. The candidate knowledge answer set corresponding to question Q may include a set $G^+$ of positive examples and a set $G^-$ of negative examples. The set of positive examples is a set having elements that are correct answers, and the set of negative examples is a set having elements that are wrong answers. During training of the KBQA, for each of the questions Q, the set of positive examples includes correct annotated answers, and the set of negative examples includes 20 wrong answers randomly sampled from the common sense knowledge base freebase-FB2M. The candidate knowledge answer set G includes at least one positive example, and the server encodes the question and the candidate knowledge answer for model training.

During encoding of the question, the server encodes the question Q from a word level and a dependency level, and then superimposes two representations obtained from the word level and the dependency level to obtain the encoded representation of the question Q.

The word-level encoding specifically means converting the question Q by using pre-trained global vectors for word representation (GloVe) to obtain a word embedding representation, and encoding the word embedding representation by using the BiLSTM network, and then splicing the representation obtained through encoding by using the BiLSTM network, to obtain the word-level representation of question Q. For example, the following equations may be used:

$$h_i^{(tok)} = \text{BiLSTM}(E_{q_i}, h_{i-1}^{(tok)}) \qquad (3)$$

$$q^{(tok)} = [\overleftarrow{h_1^{(tok)}}; \overrightarrow{h_n^{(tok)}}] \qquad (4)$$

$E_{q_i}$ being a word embedding representation of an $i^{th}$ word in the question Q, $\overleftarrow{h_1^{(tok)}}$ being a word-level encoded representation of the question Q obtained by using a reverse LSTM, and $\overrightarrow{h_n^{(tok)}}$ being a word-level encoded representation of the question Q obtained by using a forward LSTM.

In an embodiment, in order to more desirably represent a dependency relationship in the question Q, all entities in the question Q are first replaced with <E> to obtain a question Q', and a dependency relationship in the question Q' is replaced with a directional dependency label to obtain a replaced question Q". For example, {what is the best movie in the <E>} is replaced with {what $\overrightarrow{nsuj}$ is $\overrightarrow{prep}$ in $\overrightarrow{pobj}$ <E>}, and a word embedding representation is obtained through conversion by using the GloVe, and then the word embedding representation is encoded by using the BiLSTM network, and then the representation obtained through encoding by using the BiLSTM network is spliced to obtain a dependency-level representation of the question Q. For details, refer to the following equation:

$$h_j^{(dep)} = \text{BiLSTM}(E_{q_j}, h_{j-1}^{(dep)}) \qquad (5)$$

$$q^{(dep)} = [\overleftarrow{h_1^{(dep)}}; \overrightarrow{h_n^{(dep)}}] \qquad (6)$$

$\overleftarrow{h_1^{(dep)}}$ being a dependency-level encoded representation of the question Q obtained by using the reverse LSTM, and $\overrightarrow{h_n^{(dep)}}$ being a dependency-level encoded representation of the question Q obtained by using the forward LSTM.

By superimposing the above equation (4) and equation (6), the encoded representation of the question Q may be obtained as follows:

$$q = q^{(tok)} + q^{(dep)} \qquad (7).$$

For the encoding of the candidate knowledge answer, the candidate knowledge answer may be represented by using a triple. In consideration of an encoded representation of a knowledge triple, the server may encode the candidate knowledge answer from a word level and a knowledge level, and then superimpose two representations obtained from the word level and knowledge level to obtain the encoded representation of the candidate knowledge answer.

For the word-level encoding, the knowledge triple is regarded as a combination of single words. A word sequence $\{p_1^{(w)}, p_2^{(w)}, \ldots, p_n^{(w)}\}$ is provided, and each word is converted to a corresponding word embedding representation by using the pre-trained GloVe. The word embedding representation is represented by using a vector, and then an average of vectors of n words is acquired as the word-level embedding representation $p^{(w)}$ of the knowledge triple, that is, the embedding representation of the candidate knowledge answer.

For the knowledge-level encoding, the knowledge triple is regarded as a whole. The knowledge triple is provided, and the knowledge-level embedding representation $p^{(id)}$ is obtained by using a knowledge embedding representation method automatically learned by using a neural network.

In this way, the word-level embedding representation and the knowledge-level embedding representation are superimposed to obtain the encoded representation of the candidate knowledge answer as follows:

$$p=p^{(w)}+p^{(id)} \quad (8).$$

S602: Calculate a semantic matching similarity between the question and the candidate knowledge answer by using the encoded representations of the question and the candidate knowledge answer, determine an optimal answer according to the semantic matching similarity, determine a loss function based on the optimal answer, and adjust a parameter of the neural network model based on the loss function until the loss function of the neural network model converges.

A vector representation of the candidate knowledge answer set is provided as $G=\{p^{(1)}, \ldots, p^{(N)}\}$. In order to calculate the semantic matching similarity between the question and the candidate knowledge answer, the server adopts S-MART as an entity linking tool, to obtain link scores $S_{ent}$ of each of the questions Q with respect to all of the entities in the candidate knowledge answer set. An entity linking result, that is, $S_{ent}$, and the representations of the question and the candidate knowledge answer are inputted as features to an MLP network. The MLP network outputs a correlation between the question Q and each of the candidate knowledge answers in the candidate knowledge answer set G. The correlation $S(q^{(i)},p^{(i)})$ may be used as the semantic matching similarity:

$$S(q^{(i)},p^{(i)})=MLP([q^{(i)};p^i;S_{ent}]) \quad (9).$$

In an embodiment of the disclosure, the server may determine a current loss function based on the optimal answer. As shown in the above equation (2), the server adjusts the parameter of the neural network model based on the loss function (a hinge loss function), which may maximize a distance between the set of positive examples and the set of negative examples. When the loss function (a hinge loss function) of the model converges, the server may use the neural network model that converges as the KBQA model for subsequently training the dialog generation model.

S603: For a reddit data set, the server encodes the post by using the encoder of the dialog generation model to obtain a first encoded representation, obtains a second encoded representation for the post from the pre-trained KBQA through transfer learning, obtains a third encoded representation for the post by using the response guiding attention mechanism, and splices the first encoded representation, the second encoded representation, and the third encoded representation to obtain a comprehensive encoded representation.

In some embodiments of the disclosure, the reddit data set includes dialog data, and each set of dialog data includes a post and an annotated response corresponding to the post. It is assumed that a word sequence of the post is $X=\{x_1, x_2, \ldots x_{Tx}\}$. A word embedding representation $e(x_t)$ of each word $x_t$ is obtained through conversion based on the GloVe, and then a hidden layer state representation of the word is obtained through encoding by using the BiLSTM network as the first encoded representation, which may be expressed as follows:

$$h_t=BiLSTM(e(x_t),h_{t-1}) \quad (10).$$

In an embodiment of the disclosure, the server further encodes the post again by using the BiLSTM network in the pre-trained KBQA that encodes the question Q, to obtain a post representation after transfer learning, that is, the second encoded representation, which may be expressed as follows:

$$\tilde{h}_s=\tilde{h}_s^{(tok)}+\tilde{h}_s^{(dep)} \quad (11)$$

$\tilde{h}_s^{(tok)}$ representing a word-level representation of the post, and $\tilde{h}_s^{(dep)}$ representing a dependency-level representation of the post.

In addition, in order to assist generation of a dialog response more desirably, the disclosure further provides a response guiding attention mechanism. The server uses a search tool, such as Lucene, to retrieve k posts that are most similar to the post, and uses k responses corresponding to the similar posts as candidate responses, and calculates a mutual attention of an embedding representation $e(Y_i)$ of an $i^{th}$ candidate response with respect to a hidden layer state representation of the current post:

$$h_{attn}^i = \sum_{j=1}^{n} p_j h_t, \; p_j = softmax(f(h_t, e(Y_i))) \quad (12)$$

f being a non-linear activation function, which may adopt a tanh function, for example.

Then, k hidden layer state representations are weighted and averaged to obtain a final hidden layer state representation of the response guiding attention mechanism, that is, the third encoded representation, which is shown as follows:

$$h_{attn} = \frac{1}{k}\sum_{i=1}^{k} h_{attn}^i. \quad (13)$$

The above equations (11) to (13) are superimposed to obtain the comprehensive encoded representation of the post:

$$h_k=[h_t;\tilde{h}_s;h_{attn}] \quad (14).$$

S604: Fuse, by using the decoder of the dialog generation model, the comprehensive encoded representation of the post and the knowledge information obtained from the KBQA model through transfer learning to obtain a predictive response, determine a loss function based on the predicted response and the annotated response, and adjust the parameter of the dialog generation model by using the loss function until the loss function of the dialog generation model converges.

In some embodiments of the disclosure, the decoder uses the LSTM, and a calculation process of the hidden layer state representation of the decoder is:

$$s_t=LSTM(s_{t-1},[c_t;e(y_{t-1})]) \quad (15)$$

$s_{t-1}$ being a hidden layer state representation of the decoder at a decoding time step of t−11, $e(y_{t-1})$ being a word embedding representation of an t−$1^{th}$ generated word, and $c_t$ being a context attention vector at a decoding time step of t, and a calculation process thereof is:

$$c_t = \sum_{k=1}^{n} a_{tk} h_k \quad (16)$$

$$a_{tk} = \frac{\exp(e_{tk})}{\sum_{j=1}^{T_x} \exp(e_{tj})}$$

$$e_{tk} = g(s_{t-1}, h_k) = V_b^T \tanh(W_b s_{t-1} + U_b h_k)$$

$e_{tk}$ being a similarity between a hidden layer state representation of the decoder at a moment t−1 and a hidden layer state representation of the encoder at a moment k, which is a function with respect to $s_{t-1}$ and $h_k$, $V_b$, $W_b$ and $U_b$ being to-be-learned parameters in the functional relationship, and tank being a hyperbolic function; likewise, $e_{tj}$ being a similarity between a hidden layer state representation of the decoder at a moment t−1 and a hidden layer state representation of the encoder at a moment j, a value of j being a positive integer from 1 to $T_x$ (including endpoints), T being a number of words when the post is converted to a sequence of words; $a_{tk}$ being an attention weight of the decoder at a moment t at a moment k of the encoder, which may be calculated based on the above similarity.

In the Seq2Seq framework, in order to transfer knowledge information from the KBQA model, the server transmits the context attention vector to the MLP network in the previously pre-trained KBQA model:

$$r_k = MLP([c_t; e_k; S_{ent}^p]) \quad (17)$$

$$\tilde{a}_t = \frac{\sum_{k=1}^{|V_k|} r_k e_k}{\sum_{k=1}^{|V_k|} r_k}$$

$r_k$ being knowledge information obtained through transfer learning, which is an output result obtained by transmitting the context attention vector to the MLP network in the pre-trained KBQA model, $e_k$ being an entity embedding representation in a knowledge base, $S_{ent}^p$ being an entity linking score of the post, $\tilde{a}_t$ being an enhanced attention vector after transferring from the KBQA, and $|v_k|$ being a size of a vocabulary of the knowledge base.

Finally, the hidden layer state representation $s_t$ of the decoder and the enhanced attention vector $\tilde{a}_t$ are transmitted to the softmax layer to generate a predicted word distribution, thereby generating a final dialog response:

$$P(y_t|y<t,x) \propto \text{soft max}(W_0 s_t + W_p \tilde{a}_t + b_0) \quad (18)$$

$W_0$, $W_p$ and $b_0$ being to-be-learned parameters.

It would be understood that the method for generating a dialog provided in the disclosure is applicable to a plurality of artificial intelligence (AI) scenarios such as chatting robots, intelligent customer service assistants, automatic news comments, and the like.

In order to make the technical solutions of the disclosure clearer and easier to understand, the method for generating a dialog in the disclosure is described by using the application scenario of the intelligent customer service assistant.

Figure 7:
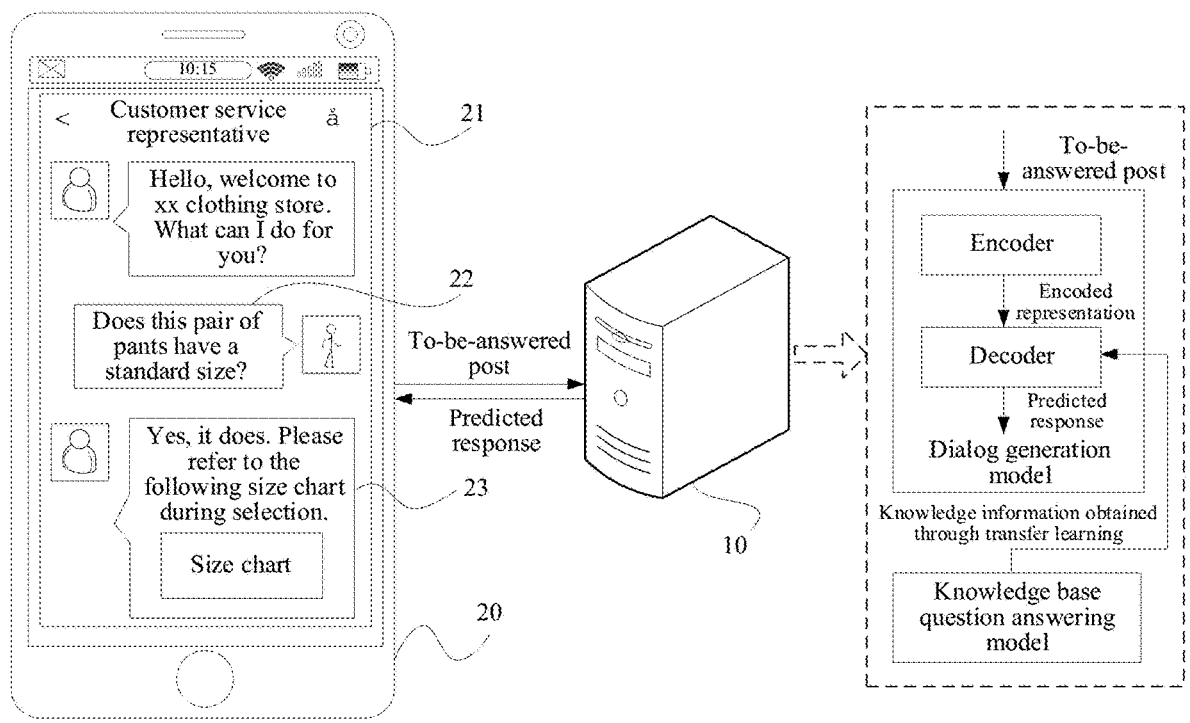
FIG. 7 is a schematic diagram of an application scenario of a method for generating a dialog according to an embodiment of the disclosure.

FIG. 7 is a schematic diagram of an application scenario of a method for generating a dialog according to an embodiment of the disclosure. Referring to FIG. 7, the scenario includes a server 10 and a terminal 20. The server 10 may be, for example but not limited to, an electronic shopping platform server. The server 10 has a dialog generation model therein. When a user asks a question by using the terminal 20, the server 10 may generate, based on the dialog generation model, a response corresponding to the post put forward by the user, and transmit the response to the terminal 20, thereby achieving intelligent customer service.

In some embodiments of the disclosure, the user inputs a post 22, that is, "Does this pair of pants have a standard size?" by using a customer service interface 21 provided on the terminal 20. The terminal 20 receives the post 22 inputted by the user, determines that the post needs to be answered, and transmits the post to the server 10 to request a corresponding response.

The server 10 receives the post transmitted by the terminal 20, inputs the post to the dialog generation model, and encodes the post by using the encoder in the dialog generation model, to obtain an encoded representation of the post. The encoded representation may be a comprehensive encoded representation obtained by splicing the first encoded representation obtained through encoding by using the encoder of the dialog generation model, the second encoded representation obtained from the knowledge base question answering model through transfer learning, and the third encoded representation determined based on the response guiding attention mechanism. The server 10 further inputs a context attention vector of the post to the MLP network in the knowledge base question answering model, to obtain an enhanced attention vector of the post by using the MLP network, and uses the enhanced attention vector as the knowledge information that is obtained for the post from the knowledge base question answering model through transfer learning.

The server 10 fuses, by using the decoder in the dialog generation model, the comprehensive encoded representation of the post and the knowledge information obtained from the knowledge base question answering model through transfer learning, and then transmits the hidden layer state representation of the decoder and the enhanced attention vector to the softmax layer, to generate a predicted word distribution, and thereby generate a final dialog response, that is, a predicted response 23. The server 10 transmits the predicted response 23 to the terminal 20, and the terminal 20 displays the predicted response 23 viewing by the user.

The above descriptions relate to illustrative implementations of the method for training a dialog generation model and the method for generating a dialog provided in the embodiments of the disclosure. An embodiment of the disclosure further provides a corresponding apparatus, which is described below from a perspective of function modularization.

Figure 8:
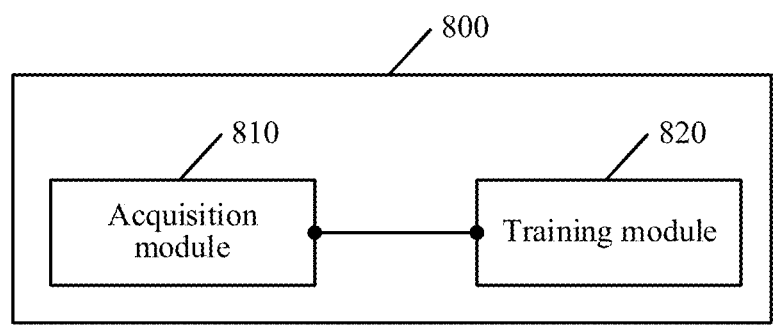
FIG. 8 is a schematic structural diagram of an apparatus for training a dialog generation model according to an embodiment of the disclosure.

FIG. 8 is a schematic structural diagram of an apparatus for training a dialog generation model according to an embodiment of the disclosure. Referring to FIG. 8, the apparatus 800 includes:

an acquisition module 810, configured to acquire a dialog data set, dialog data in the dialog data set including a post and an annotated response corresponding to the post; and a training module 820, configured to obtain an encoded representation of the post by using an encoder in a constructed dialog generation model based on the post in the dialog data set, fuse, by using a decoder in the dialog generation model, the encoded representation of the post and knowledge information that is obtained for the post from a knowledge base question answering model through transfer learning to obtain a predicted response corresponding to the post that is outputted by the dialog generation model, determine a loss function based on the predicted response and the annotated response that correspond to the post, and adjust a parameter of the dialog generation model by using a loss function until the loss function of the dialog generation model converges.

Figure 9:
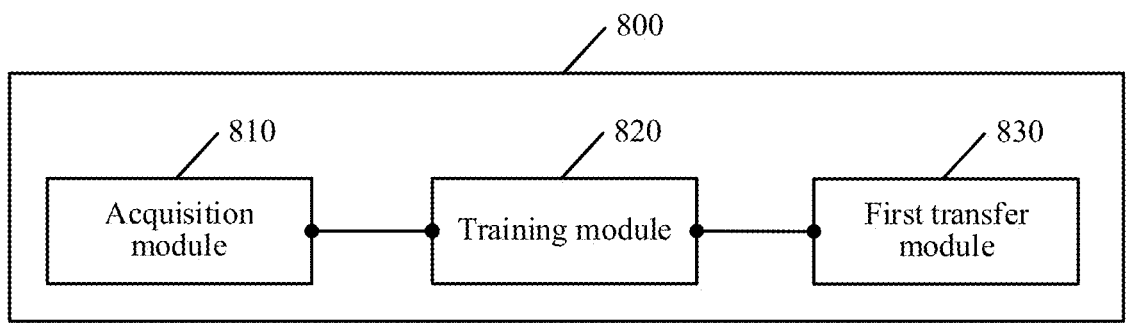
FIG. 9 is a schematic structural diagram of an apparatus for training a dialog generation model according to an embodiment of the disclosure.

FIG. 9 is a schematic structural diagram of an apparatus for training a dialog generation model according to an embodiment of the disclosure. Based on the structure shown in FIG. 8, the apparatus 800 in FIG. 9 further includes:

a first transfer module 830, configured to obtain a context attention vector of the post, inputs the context attention vector of the post to a multi-layer perceptron network in the knowledge base question answering mode obtaining an enhanced attention vector of the post by using the multi-layer perceptron network, and use the enhanced attention vector of the post as the knowledge information that is obtained for the post from the knowledge base question answering model through transfer learning.

Figure 10:
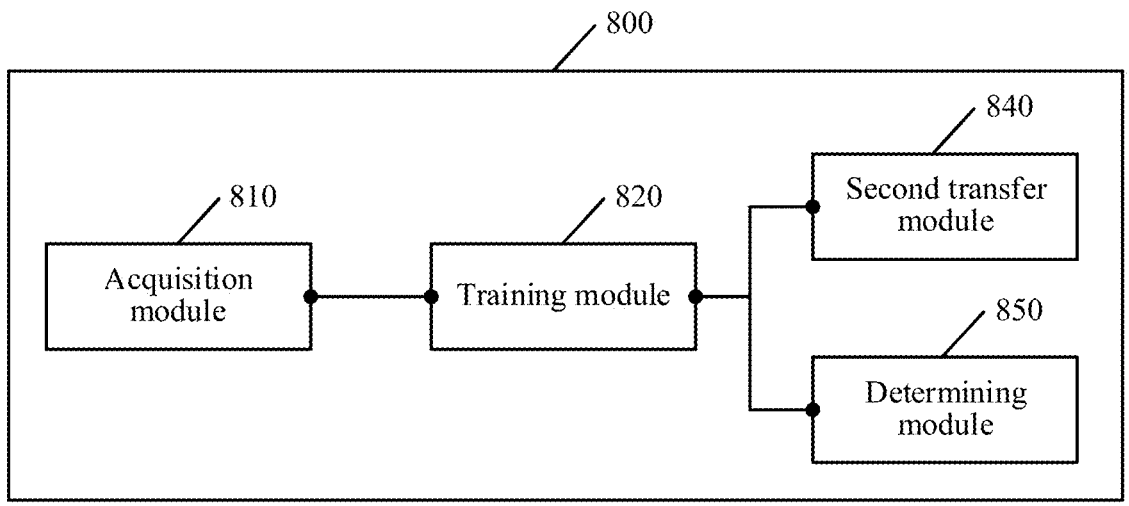
FIG. 10 is a schematic structural diagram of an apparatus for training a dialog generation model according to an embodiment of the disclosure.

FIG. 10 is a schematic structural diagram of an apparatus for training a dialog generation model according to an embodiment of the disclosure. Repetitive descriptions in view of FIG. 8 may be omitted. Based on the structure shown in FIG. 8, the apparatus 800 in FIG. 10 further includes:

a second transfer module 840, configured to input the post to the knowledge base question answering model to obtain an encoded representation outputted by an encoder in the knowledge base question answering model as a second encoded representation of the post; and a determining module 850, configured to determine a response corresponding to a similar post to the post as a similar candidate response, and determine, according to a word embedding representation of the similar candidate response and the first encoded representation of the post, a mutual attention as a third encoded representation of the post.

The training module 820 is further configured to:

use the encoded representation of the post that is obtained by using the encoder in the dialog generation model as a first encoded representation of the post;

splice at least one of the second encoded representation and the third encoded representation of the post with the first encoded representation of the post, and use a spliced encoded representation as a comprehensive encoded representation of the post; and fuse, by using a decoder in the dialog generation model, the comprehensive encoded representation of the post and knowledge information that is obtained for the post from a knowledge base question answering model through transfer learning.

Figure 11:
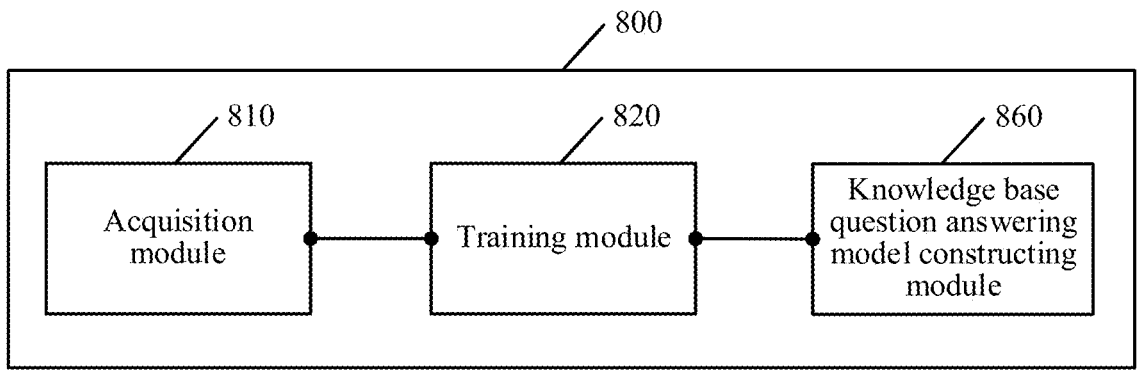
FIG. 11 is a schematic structural diagram of an apparatus for training a dialog generation model according to an embodiment of the disclosure.

FIG. 11 is a schematic structural diagram of an apparatus for training a dialog generation model according to an embodiment of the disclosure. Repetitive descriptions in view of FIG. 8 may be omitted. Based on the structure shown in FIG. 8, the apparatus 800 in FIG. 11 further includes:

a knowledge base question answering model constructing module 860, configured to construct a neural network model having an end-to-end structure, train the neural network model based on a general data set and a common sense knowledge base, adjust a parameter of the neural network model by using a hinge loss function until a loss function of the neural network model converges, and use the neural network model that converges as the knowledge base question answering model.

FIG. 11 may further include the above knowledge base question answering model constructing module based on FIG. 9 or FIG. 10.

In an embodiment of the disclosure, during the obtaining of the encoded representation of the post by using the encoder in the constructed dialog generation model, the training module 820 is further configured to:

determine a word embedding representation of the post based on a word embedding model by using the constructed dialog generation model, obtain a hidden layer state representation according to the word embedding representation through encoding by using a bidirectional long short-term memory network, and use the hidden layer state representation as the encoded representation of the post.

Figure 12:
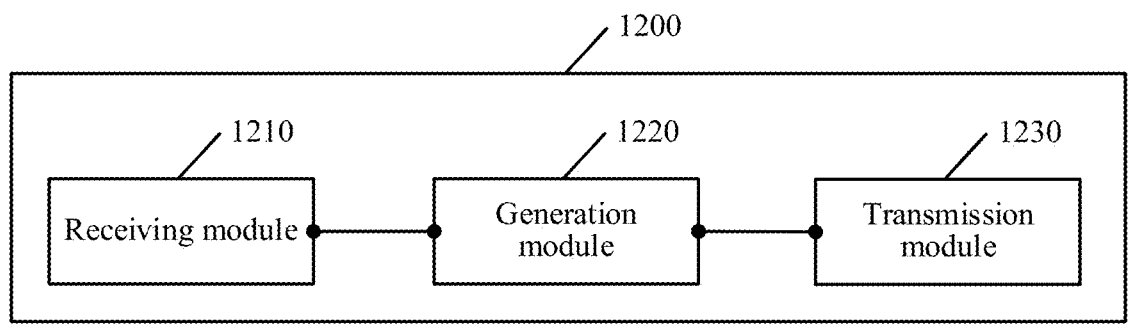
FIG. 12 is a schematic structural diagram of an apparatus for generating a dialog according to an embodiment of the disclosure.

FIG. 12 is a schematic structural diagram of an apparatus for generating a dialog according to an embodiment of the disclosure. Referring to FIG. 12, an apparatus 1200 includes:

a receiving module 1210, configured to receive a post transmitted by a terminal;

a generation module 1220, configured to obtain an encoded representation of the post by using an encoder in a pre-trained dialog generation model, and fuse, by using a decoder in the dialog generation model, the encoded representation of the post and knowledge information that is obtained for the post from a knowledge base question answering model through transfer learning. to obtain a predicted response corresponding to the post that is outputted by the dialog generation model; and a transmission module 1230, configured to transmit the predicted response to the terminal.

Figure 13:
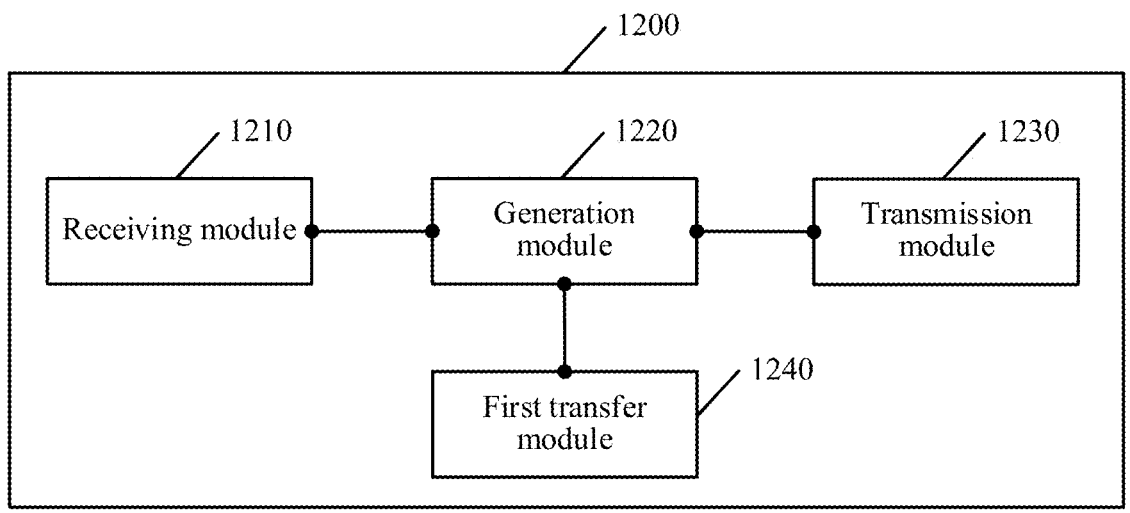
FIG. 13 is a schematic structural diagram of an apparatus for generating a dialog according to an embodiment of the disclosure.

FIG. 13 is a schematic structural diagram of an apparatus for generating a dialog according to an embodiment of the disclosure. Repetitive descriptions in view of FIG. 12 may be omitted. Based on the structure shown in FIG. 12, the apparatus 1200 in FIG. 13 further includes:

a first transfer module 1240, configured to obtain a context attention vector of the post, input the context attention vector of the post to a multi-layer perceptron network in the knowledge base question answering model, obtain an enhanced attention vector of the post by using the multi-layer perceptron network, and uses the enhanced attention vector of the post as the knowledge information that is obtained for the post from the knowledge base question answering model through transfer learning.

In an embodiment of the disclosure, during the obtaining of the enhanced attention vector of the post by using the multi-layer perceptron network, the first transfer module 1240 is further configured to:

acquire knowledge information obtained by the multi-layer perceptron network through transfer respectively based on the context attention vector of the post and words in a knowledge base vocabulary; and determine the enhanced attention vector of the post according to the context attention vector of the post and an entity embedding representation of each word in the knowledge base vocabulary.

In an embodiment of the disclosure, during the obtaining of the predicted response corresponding to the post that is outputted by the dialog generation model, the first transfer module 1240 is further configured to:

obtain a hidden layer state representation of the decoder in the dialog generation model;

input the hidden layer state representation of the decoder in the dialog generation model and the enhanced attention vector to a classification layer in the dialog generation model; and generate the predicted response corresponding to the post according to a predicted word distribution outputted by the classification layer.

In an embodiment of the disclosure, during obtaining of the hidden layer state representation of the decoder in the dialog generation model, the first transfer module 1240 is further configured to:

use a hidden state representation of the encoder in the dialog generation model for a last word in the post as an initial state of the decoder in the dialog generation model, and use a preset symbol as an initial symbol; and use a state of the decoder in the dialog generation model at a previous time step, a word embedding representation corresponding to a symbol generated at the previous time step and an attention vector generated at a current time step of the encoder in the dialog generation model as an input of the decoder in the dialog generation model to obtain a hidden layer state representation of the decoder in the dialog generation model at the current time step.

Figure 14:
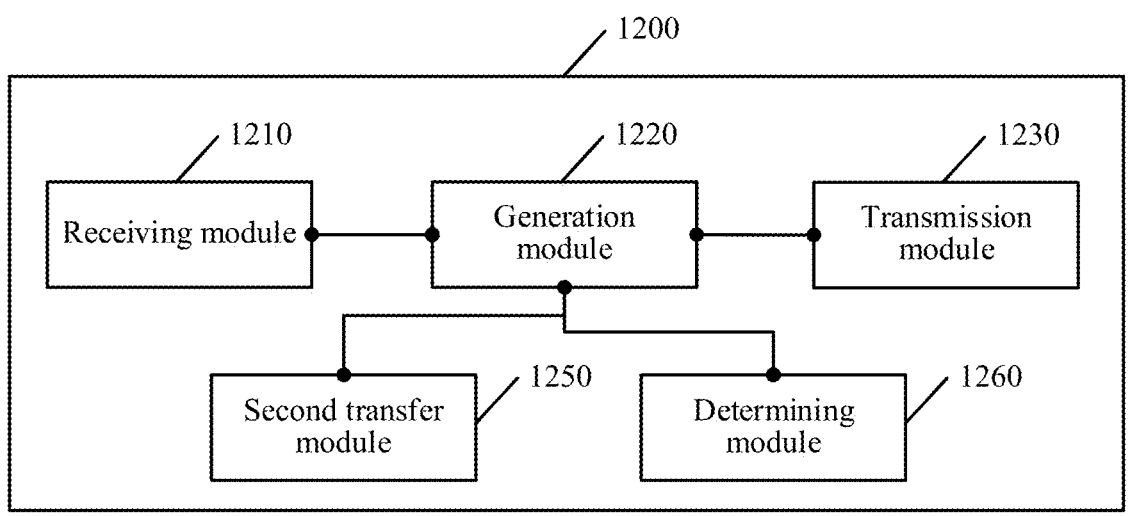
FIG. 14 is a schematic structural diagram of an apparatus for generating a dialog according to an embodiment of the disclosure.

FIG. 14 is a schematic structural diagram of an apparatus for generating a dialog according to an embodiment of the disclosure. Repetitive descriptions in view of FIG. 12 may be omitted. Based on the structure shown in FIG. 12, the apparatus 1200 in FIG. 14 further includes:

a second transfer module 1250, configured to input the post to the knowledge base question answering model to obtain an encoded representation outputted by an encoder in the knowledge base question answering model as a second encoded representation of the post; and a determining module 1260, configured to determine a response corresponding to a similar post to the post as a similar candidate response, and determine, according to a word embedding representation of the similar candidate response and the first encoded representation of the post, a mutual attention as a third encoded representation of the post.

The generation module 1220 is further configured to:

use the encoded representation of the post that is obtained by using the encoder in the dialog generation model as a first encoded representation of the post;

splice at least one of the second encoded representation and the third encoded representation of the post with the first encoded representation of the post, and use a spliced encoded representation as a comprehensive encoded representation of the post; and fuse, by using a decoder in the dialog generation model, the comprehensive encoded representation of the post and knowledge information that is obtained for the post from a knowledge base question answering model through transfer learning.

Based on illustrative implementations of the above method and the above apparatus provided in the disclosure, an embodiment of the disclosure further provides a device for training a dialog generation model and a device for generating a dialog. The devices provided in an embodiment of the disclosure are described below from a perspective of hardware materialization.

Figure 15:
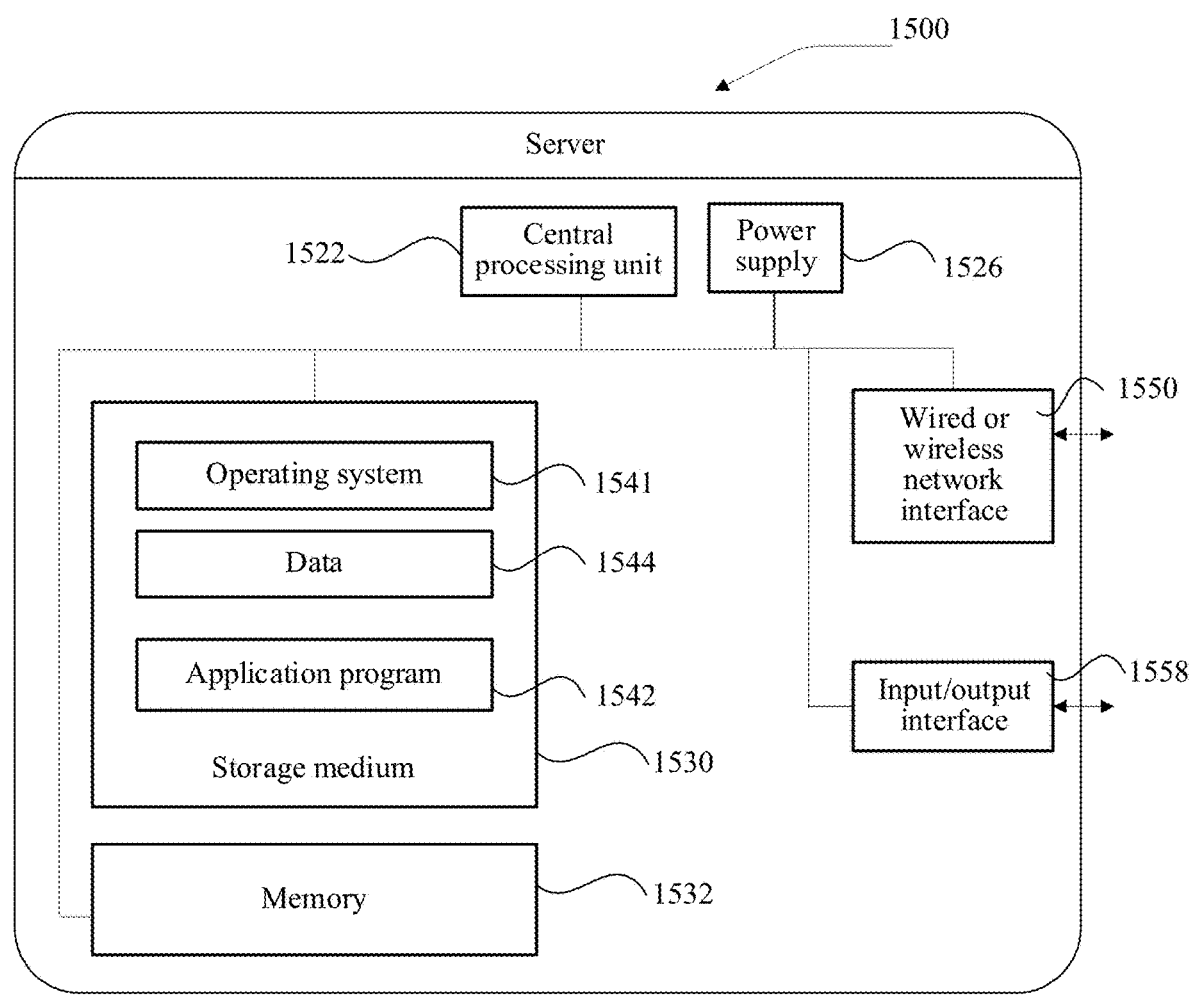
FIG. 15 is a schematic structural diagram of a device according to an embodiment of the disclosure.

FIG. 15 is a schematic structural diagram of a device according to an embodiment of the disclosure. For example, the device may be a server 1500. The server 1500 may vary greatly due to different configurations or performance, and may include one or more central processing units (CPU) 1522 (for example, one or more processors) and a memory 1532, and one or more storage media 1530 (for example, one or more mass storage devices) that store an application program 1542 or data 1544. The memory 1532 and the storage media 1530 may temporarily or persistently store the application programs or data. The program stored in the storage medium 1530 may include one or more modules (not shown in the figure), and each module may include a series of instruction operations for the server. In some embodiments of the disclosure, the CPU 1522 may be configured to communicate with the storage medium 1530 to perform the series of instruction operations in the storage medium 1530 on the server 1500.

The server 1500 may further include one or more power supplies 1526, one or more wired or wireless network interfaces 1550, one or more input/output interfaces 1558, and/or one or more OSs 1541, for example, Windows Server™, Mac OS X™, Unix™, Linux™, or FreeBSD™.

The operations performed by the server in the foregoing embodiment may be based on the structure of the server shown in FIG. 15.

The CPU 1522 is configured to perform the following operations:

acquiring a dialog data set, dialog data in the dialog data set including a post and an annotated response corresponding to the post;

obtaining an encoded representation of the post by using an encoder in a constructed dialog generation model based on the post in the dialog data set, and fusing, by using a decoder in the dialog generation model, the encoded representation of the post and knowledge information that is obtained for the post from a knowledge base question answering model through transfer to obtain a predicted response corresponding to the post that is outputted by the dialog generation model; and determining a loss function based on the predicted response and the annotated response that correspond to the post, and adjusting a parameter of the dialog generation model by using the loss function until the loss function of the dialog generation model converges.

In an embodiment of the disclosure, the CPU 1522 is further configured to perform the method for training a dialog generation model provided in the disclosure.

The disclosure further provides another device configured to generate a dialog and having the same structure as that in FIG. 15. In the device, the CPU 1522 is configured to perform the following operations:

receiving a post transmitted by a terminal;

obtaining an encoded representation of the post by using an encoder in a pre-trained dialog generation model, and fusing, by using a decoder in the dialog generation model, the encoded representation of the post and knowledge information that is obtained for the post from a knowledge base question answering model through transfer learning to obtain a predicted response corresponding to the post that is outputted by the dialog generation model; and transmitting the predicted response to the terminal.

In an embodiment of the disclosure, the CPU 1522 is further configured to perform operations of any implementation of the method for generating a dialog provided in the disclosure.

An embodiment of the disclosure further provides a computer-readable storage medium storing a computer program, the computer program being used for performing any implementation of the method for training a dialog generation model or the method for generating a dialog according to the various example embodiments of the disclosure.

An embodiment of the disclosure further provides a computer program product including instructions, the instructions, when executed on a computer, causing the computer to perform any implementation of the method for training a dialog generation model or the method for generating a dialog according to the various example embodiments of the disclosure.

A person skilled in the art would clearly understand that for convenience and conciseness of description, with respect to working processes of the foregoing described system, apparatus and unit, reference may be made to the corresponding processes in the foregoing method embodiments, and details are not described herein.

In the embodiments provided in the disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the disclosure may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the operations of the methods described in the embodiments of the disclosure. The foregoing storage medium includes: any medium that may store program code, such as a USB flash drive, a removable hard disk, a read-only memory (ROM), a random access memory (RAM), a magnetic disk, or an optical disc.

The method, apparatus, device, and computer storage medium for training a dialog generation model and generating a dialog according to the embodiments of the disclosure have at least the following beneficial technical effects.

1) In the embodiments of the disclosure, during training of the model, a dialog data set is first acquired, each piece of dialog data in the dialog data set that is used as a training sample including a post and an annotated response corresponding to the post; an encoded representation of the post is obtained by using an encoder in the dialog generation model based on the post in the training sample; and the encoded representation of the post and knowledge information that is obtained for the post from a knowledge base question answering model through transfer learning are fused by using a decoder in the dialog generation model. Since the knowledge information in the knowledge base question answering model has a relatively high precision, a predicted response corresponding to the post that is outputted by the dialog generation model by fusing the knowledge information has a relatively high precision. A parameter of the dialog generation model is adjusted based on a loss function determined based on the predicted response and the annotated response to achieve model training, which not only improves training efficiency of the model, but also improves a precision of the model.

2) Based on the dialog generation model trained by using the above method for training a model, an embodiment of the disclosure further provides a method for generating a dialog. The dialog generation model transfers the knowledge information in the knowledge base question answering model to an open-domain dialog generation task. By virtue of a high precision of the knowledge base question answering model, the model may more desirably fuse the knowledge information, thereby improving accuracy and rationality of dialog generation. In this way, users may more conveniently obtain high-quality dialog information, and impact of general responses on usage is reduced for the users.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions of the disclosure, but not for limiting the disclosure. Although the present disclosure is described in detail with reference to the foregoing embodiments, It is to be understood by a person of ordinary skill in the art that modifications may be made to the technical solutions described in the foregoing embodiments, or equivalent replacements may be made to some technical features in the technical solutions, as long as such modifications or replacements do not cause the essence of corresponding technical solutions to depart from the spirit and scope of the technical solutions of the embodiments of the present disclosure.

What is claimed is:

1. A method for training a dialog generation model, performed by a server, the method comprising:
   acquiring a dialog data set, each piece of dialog data in the dialog data set that is used as a training sample comprising a post and an annotated response corresponding to the post;
   encoding the post in the dialog data set by using an encoder in a dialog generation model to obtain a first encoded representation of the post;
   fusing, by using a decoder in the dialog generation model, the first encoded representation of the post and knowledge information corresponding to the post, to obtain a predicted response corresponding to the post, the knowledge information being obtained from a knowledge base question answering model through transfer learning;
   determining a value of a loss function of the dialog generation model based on the predicted response and the annotated response that corresponds to the post; and
   updating a model parameter of the dialog generation model based on the value of the loss function.

2. The method according to claim 1, wherein the knowledge information is obtained by performing:
   inputting a context attention vector of the post to a multi-layer perceptron network in the knowledge base question answering model; and
   obtaining, as the knowledge information corresponding to the post, an enhanced attention vector of the post by using the multi-layer perceptron network.

3. The method according to claim 1, wherein the encoding the post comprises:
   determining a word embedding representation of the post by using the encoder in the dialog generation model based on a word embedding model; and
   encoding the word embedding representation by using a bidirectional long short-term memory network of the encoder to obtain, as the first encoded representation of the post, a hidden layer state representation.

4. The method according to claim 1, further comprising:
   inputting the post to the knowledge base question answering model, and encoding the post by using an encoder in the knowledge base question answering model to obtain a second encoded representation of the post; and
   splicing the first encoded representation and the second encoded representation to obtain a comprehensive encoded representation of the post.

5. The method according to claim 1, further comprising:
   determining a response corresponding to a similar post to the post as a similar candidate response, and determining, according to a word embedding representation of the similar candidate response and the first encoded representation of the post, a mutual attention as a third encoded representation of the post; and
   splicing the first encoded representation and the third encoded representation, to obtain a comprehensive encoded representation of the post.

6. The method according to claim 1, further comprising:
   inputting the post to the knowledge base question answering model to obtain an encoded representation outputted by an encoder in the knowledge base question answering model as a second encoded representation of the post;
   determining a response corresponding to a similar post to the post as a similar candidate response, and determining, according to a word embedding representation of the similar candidate response and the first encoded representation of the post, a mutual attention as a third encoded representation of the post; and
   splicing the first encoded representation, the second encoded representation, and the third encoded representation, to obtain a comprehensive encoded representation of the post.

7. The method according to claim 1, further comprising:
   obtaining a comprehensive encoded representation of the post by splicing the first encoded representation of the post with at least one of a second encoded representation of the post and a third encoded representation of the post, wherein
   the second encoded representation is obtained by inputting the post to the knowledge base question answering model, and encoding the post by using an encoder in the knowledge base question answering model, and
   the third encoded representation is obtained by determining a response corresponding to a similar post to the post as a similar candidate response, and determining, according to a word embedding representation of the similar candidate response and the first encoded representation of the post, a mutual attention,
   wherein the fusing comprises:
   fusing, by using the decoder in the dialog generation model, the comprehensive encoded representation of the post and the knowledge information.

8. The method according to claim 1, further comprising:
   constructing a neural network model having an end-to-end structure;
   acquiring a general data set and a common sense knowledge base that match the neural network model; and
   based on a plurality of sets of question answering data included in the general data set, adjusting a parameter of the neural network model by using a loss function matching the neural network model, until the loss function converges, and using the neural network model that converges as the knowledge base question answering model to train the dialog generation model.

9. The method according to claim 8, further comprising:
   encoding a question and a corresponding candidate knowledge answer in the general data set and the common sense knowledge base to obtain an encoded representation of the question and an encoded representation of the corresponding candidate knowledge answer;
   determining a semantic matching similarity between the first encoded representation of the question and the first encoded representation of the corresponding candidate knowledge answer; and
   determining an optimal answer according to the semantic matching similarity, and determining, based on the optimal answer, a loss function matching the knowledge base question answering model.

10. A device, comprising at least one processor and at least one memory,
    the at least one memory being configured to store a computer program; and
    the at least one processor being configured to read the computer program and operate as instructed by the computer program to perform the method according to claim 9.

11. A method for generating a dialog, performed by a server, the method comprising:
- receiving a post from a terminal;
- obtaining a first encoded representation of the post by using an encoder in a dialog generation model, the dialog generation model being pre-trained by using knowledge information obtained from a knowledge base question answering model through transfer learning;
- fusing, by using a decoder in the dialog generation model, the first encoded representation of the post and knowledge information corresponding to the post, to obtain a predicted response corresponding to the post that is outputted by the dialog generation model, the knowledge information corresponding to the post being obtained from the knowledge base question answering model through the transfer learning; and
- transmitting the predicted response to the terminal.

12. The method according to claim 11, wherein the knowledge information is obtained by:
- inputting a context attention vector of the post to a multi-layer perceptron network in the knowledge base question answering model; and
- obtaining, as the knowledge information corresponding to the post, an enhanced attention vector of the post by using the multi-layer perceptron network.

13. The method according to claim 12, wherein the obtaining the enhanced attention vector comprises:
- acquiring knowledge information obtained by the multi-layer perceptron network through transfer respectively based on the context attention vector of the post and words in a knowledge base vocabulary; and
- determining the enhanced attention vector of the post according to the context attention vector of the post and an entity embedding representation of each word in the knowledge base vocabulary.

14. The method according to claim 13, wherein the obtaining the predicted response comprises:
- obtaining a hidden layer state representation of the decoder in the dialog generation model;
- inputting the hidden layer state representation of the decoder in the dialog generation model and the enhanced attention vector to a classification layer in the dialog generation model; and
- generating the predicted response corresponding to the post according to a predicted word distribution outputted by the classification layer.

15. The method according to claim 14, wherein the obtaining the hidden layer state representation comprises:
- determining, as an initial state of the decoder in the dialog generation model, a hidden state representation of the encoder in the dialog generation model for a last word in the post, and determining a preset symbol as an initial symbol; and
- determining, as an input of the decoder in the dialog generation model, a state of the decoder in the dialog generation model at a previous time step, a word embedding representation corresponding to a symbol generated at the previous time step and an attention vector generated at a current time step of the encoder in the dialog generation model, to obtain a hidden layer state representation of the decoder in the dialog generation model at the current time step.

16. The method according to claim 11, further comprising:
- inputting the post to the knowledge base question answering model, and encoding the post by using an encoder in the knowledge base question answering model to obtain a second encoded representation of the post; and
- splicing the first encoded representation and the second encoded representation to obtain a comprehensive encoded representation of the post.

17. The method according to claim 11, further comprising:
- determining a response corresponding to a similar post to the post as a similar candidate response, and determining, according to a word embedding representation of the similar candidate response and the first encoded representation of the post, a mutual attention as a third encoded representation of the post; and
- splicing the first encoded representation of the post and the third encoded representation of the post, to obtain a comprehensive encoded representation of the post.

18. The method according to claim 11, further comprising:
- inputting the post to the knowledge base question answering model to obtain an encoded representation outputted by an encoder in the knowledge base question answering model as a second encoded representation of the post;
- determining a response corresponding to a similar post to the post as a similar candidate response, and determining, according to a word embedding representation of the similar candidate response and the first encoded representation of the post, a mutual attention as a third encoded representation of the post; and
- splicing the first encoded representation of the post, the second encoded representation of the post, and the third encoded representation of the post, to obtain a comprehensive encoded representation of the post.

19. The method according to claim 11, further comprising:
- obtaining a comprehensive encoded representation of the post by splicing the first encoded representation of the post with at least one of a second encoded representation of the post and a third encoded representation of the post, wherein
  - the second encoded representation is obtained by inputting the post to the knowledge base question answering model, and encoding the post by using an encoder in the knowledge base question answering model, and
  - the third encoded representation is obtained by determining a response corresponding to a similar post to the post as a similar candidate response, and determining, according to a word embedding representation of the similar candidate response and the first encoded representation of the post, a mutual attention,
- wherein the fusing comprises:
- fusing, by using the decoder in the dialog generation model, the comprehensive encoded representation of the post and the knowledge information corresponding to the post.

20. An apparatus for training a dialog generation model, comprising:
- at least one memory configured to store program code; and
- at least one processor configured to read the program code and operate as instructed by the program code, the program code comprising:
  - acquisition code configured to cause the at least one processor to acquire a dialog data set, each piece of dialog data in the dialog data set that is used as a training sample comprising a post and an annotated response corresponding to the post; and training code configured to cause the at least one processor to:

encode the post in the dialog data set by using an encoder in a dialog generation model to obtain an encoded representation of the post;

fuse, by using a decoder in the dialog generation model, the encoded representation of the post and knowledge information corresponding to the post, to obtain a predicted response corresponding to the post, the knowledge information being obtained from a knowledge base question answering model through transfer learning;

determine a value of a loss function of the dialog generation model based on the predicted response and the annotated response that correspond to the post; and update a model parameter of the dialog generation model based on the value of the loss function.

\* \* \* \* \*